June 10, 1930. S. J. V. BOVEY 1,762,467
AUTOMOBILE HEATER AND THE SILENCING OF AUTOMOBILE HEATERS
Filed Jan. 13, 1928 2 Sheets-Sheet 2
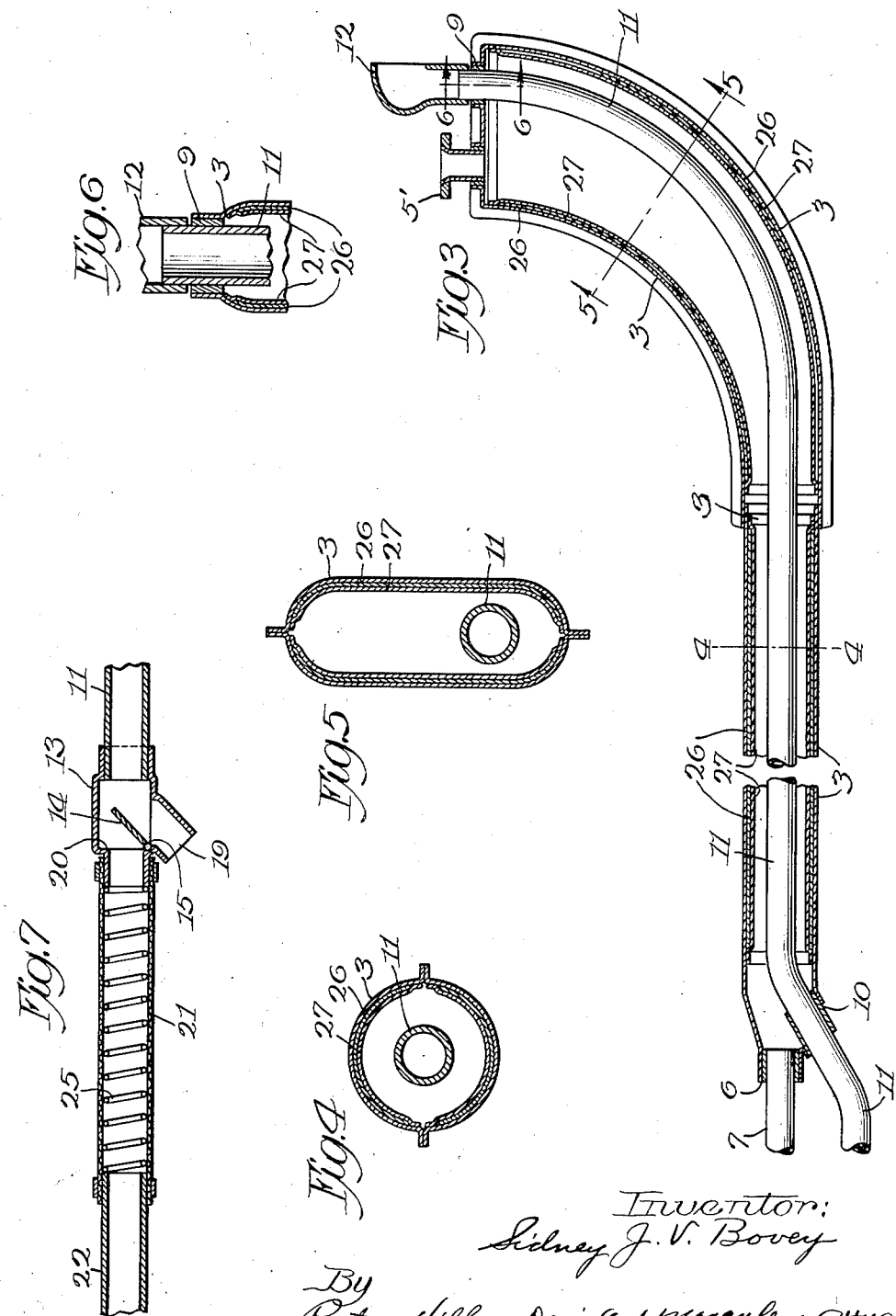

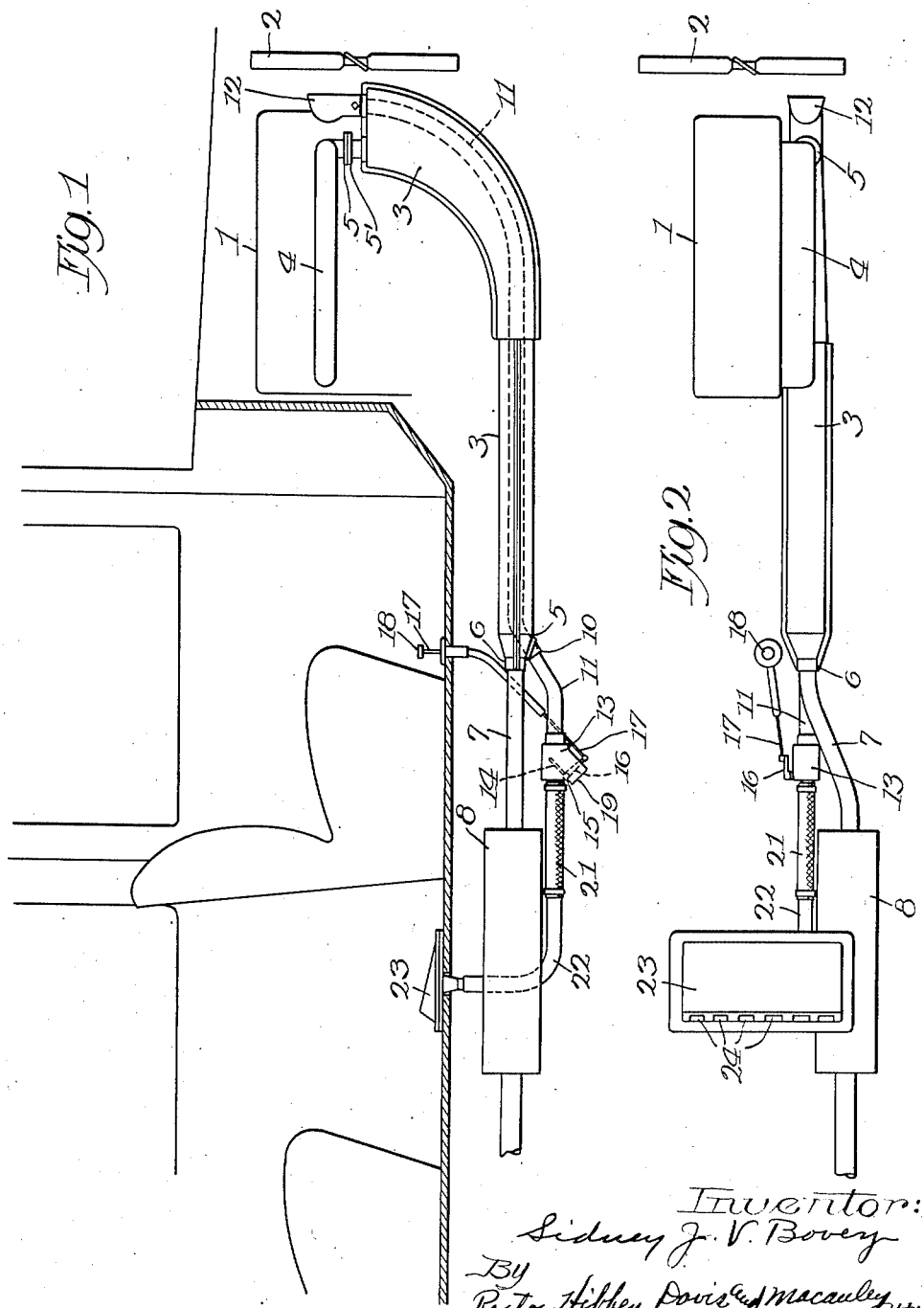

Patented June 10, 1930

1,762,467

UNITED STATES PATENT OFFICE

SIDNEY J. V. BOVEY, OF CHICAGO, ILLINOIS, ASSIGNOR, BY MESNE ASSIGNMENTS, TO METALCRAFT HEATER CORPORATION, OF GRAND RAPIDS, MICHIGAN, A CORPORATION OF MICHIGAN

AUTOMOBILE HEATER AND THE SILENCING OF AUTOMOBILE HEATERS

Application filed January 13, 1928. Serial No. 246,436.

This invention relates to an improvement in the silencing of automobile heaters.

In designing the modern automobile great effort is made to reduce the noises incident to its operation to a minimum. Mufflers are provided that practically silence the noise of the exhaust from the engine. Rubber parts are inserted between the engine and its support; non-metallic gears are used to operate the cam shaft and non-metallic inserts are placed in the valve tappets and have greatly reduced the noise produced when the engine is in operation. Balloon tires operating at much lower pressures than the formerly used high pressure hard tires are now almost universally used and they greatly reduce the noise incident to the operation of the car over bumpy roads.

Silence in the operation of an automobile is not only of value as contributing to the comfort of the occupants of the car, particularly to the reduction of nerve strain on long trips or tours, but it also has a great value mechanically as it enables the driver to detect any noises due to faulty mechanism as soon as trouble starts and to correct it before the trouble becomes dangerous.

The blower type of automobile heater, which is rapidly coming into general use, is the type in which a current of air created by a fan is passed through a heating element wherein it absorbs heat from the exhaust gases of the motive power and delivers this heated air into the body of the car. It has heretofore caused noises that are very objectionable and that emanate from two different sources. I have discovered a means of effectively silencing both of these noises.

I found one source of noise to be from the impulses of the exhaust gases of the motive power of the automobile in passing at high pressure into the enlarged chamber of the heating unit. They set up a vibration which causes a ringing noise and this sound is carried along into the interior of the car where it is quite noticeable. This I will call the primary source of noise. I also found another source of noise to be that the vibrations from the engine and the noise of the fan are carried along by the metallic tubing of which such a heater is constructed and into the interior of the car. This I will call the secondary source of noise. I eliminate that by the insertion of a short length of flexible, non-metallic fabric hose in the line of tubing through which the air passes on its way into the interior of the car and use any resilient means, such as a coil spring, to keep the hose distended.

In practice and in tests I discovered the source of the noise that I have called the primary noise to be outside of the heat-collecting tube and that it was not eliminated by the insertion of the fabric hose. In order to silence this primary noise I have invented a means of muffling or dampening these vibrations.

I have also found that in carrying out my invention, the efficiency of the heating system as a whole is greatly increased, the heating collecting medium is delivered to the interior of the car at a much higher temperature.

Other objects and advantages will become apparent as this description progresses.

Referring now to the drawings which accompany and form a part of this specification, and illustrate one form of embodiment of my invention:

Figure 1 is a side view of an automobile heater of the blower type in which my invention is embodied, as installed in its proper location in an automobile;

Fig. 2 is a plan view of Fig. 1 with the car body omitted;

Fig. 3 is a section longitudinally through the heating unit of the heater;

Fig. 4 is a cross section on the line 4—4 of Fig. 3;

Fig. 5 is a cross section on the line 5—5 of Fig. 3;

Fig. 6 is a longitudinal section along the line 6—6 of Fig. 3 in the direction of the arrows;

Fig. 7 is a longitudinal section through the controlling valve and the fabric hose silencer.

In Fig. 1 the engine is designated as 1, the fan as 2 and the casing of the heating unit as 3, the exhaust manifold of the engine as 4, having a flange 5 connected with a like flange 5' on the forward end of the casing 3. On its opposite or rear end the casing 3 is provided with a connection 6 from which a pipe 7 connects it with the muffler 8.

The casing 3 is formed in two sections sleeved together at 3' and is provided with two openings 9 and 10, Fig. 3, through which a jointless tube 11 passes. This tube 11 is connected with a funnel 12, Figs. 1, 2, 3 and 6, behind the fan 2 to receive the air from the fan. Connected to the rear end of the tube 11 is a valve casing 13 which contains a valve disk 14, Fig. 7, pivoted on a valve shaft 15 having an operating arm 16 (Fig. 2). Connected to this operating arm is a pull-and-push control rod 17 operated by a knob 18 inside of the car near the driver's feet. The valve casing 13 is provided with an exhaust opening 19 and the valve disk 14 is adjusted to close the opening 19 when heat is wanted in the car or to open it to atmosphere and close the outlet opening 20 when heat is not desired.

Connected to the outlet of the valve casing 13 is a fabric hose 21, Figs. 1, 2 and 7, to which is connected a pipe 22. The pipe 22 connects to one end of a register 23 within the body of the car. The openings 24 in the register 23 admit the heated medium to the interior of the car. Within the fabric hose 21 is a coil spring 25 that serves to maintain the hose in distended position.

Within the casing 3 and formed to the shape of the walls of the casing is a non-metallic, heat-resisting lining 26, such as asbestos or other suitable material. In Fig. 3 it is shown, for convenience in assembling, in two parts covering all of the casing excepting a small portion near the center adjacent the sleeve connection 3'. This lining serves as a dampening member to prevent the vibrations that cause what I term the primary noise in the heater. This also serves to prevent cooling of the hot exhaust gases with the result that there is a maximum transfer of heat from such gases to the heat collecting medium.

I have formed the casing 3 of such size that no increase in the back pressure can occur on account of its use, but to insure that no increase in the back pressure can occur from the friction of the gases against the asbestos silencing member 26 I have provided a metal liner 27 in each section of the casing 3, conforming in shape to the asbestos members 26. In Figs. 3, 4, and 5, these parts are shown in section in their proper relation.

The metal liner 27 is shown as made from a solid sheet of metal, but I have tested liners made from sheets of perforated metal and find that they perform equally as well as those made from the solid sheet.

The fabric hose 21 serves to silence what I have called the secondary noises and the spring 25 serves to hold the hose open. A fabric hose could be used with walls thick enough to remain in distended position without the spring 25, but I have found the construction shown to be cheaper and that the spring does not offer any appreciable resistance to the flow of air through the hose. The spring also prevents any accidental closing of the hose, as from any outside pressure that it might accidentally be subjected to during the period of cleaning, repairing or the performing of other work on the car.

It will be seen that the foregoing construction is well adapted to accomplish the objects primarily stated as this construction has, after very severe tests, been adopted by leading manufacturers of automobiles; at the same time it is to be understood that the invention is not limited to the exact form of embodiment.

I claim:

1. In a heating system for heating the interior of an automobile body, the combination with an air blower device, of a heating unit comprising means for collecting air from said blower, an outer casing member adapted to receive a fluid heating medium, said casing having a heat-insulating medium along and substantially throughout its inner wall, a metal covering over said heat-insulating medium of such a character to offer as a minimum of flow-resistance to said heating medium, a conduit leading from said air-collecting means through said casing in spaced relation to said metal covering and leading to the exterior of said casing, a hot air register adapted to be located within the automobile body space to be heated, and another conduit including a fabric section through which the heated air must pass and leading from said first-named conduit to said register for discharging heated air into the automobile body.

2. In a heating system for heating the interior of an automobile body, the combination with an air blower device, of a heating unit comprising means for collecting air from said blower, an outer casing member adapted to receive a fluid heating medium, said casing having a heat-insulating medium along and substantially throughout its inner wall, a metal covering over said heat-insulating medium of such a character to offer as a minimum of flow-resistance to said heating medium, a conduit leading from said air-collecting means through said casing in spaced relation to said metal covering and leading to the exterior of said casing, a hot air register adapted to be located within the automobile body space to be heated, and another conduit including noise-dampening means therein and leading from said first-named conduit to said register for discharging heated air into the automobile body.

3. In a heating apparatus for vehicle bodies, a shell constituting a conduit for engine exhaust gases, a non-metallic heat-resisting sheet constituting an interior lining for the shell, a metallic sheet conforming in shape to the shell and overlying and constituting a protecting lining for the sheet aforesaid, and means for conducting air from the atmosphere longitudinally through the shell to the atmosphere within a vehicle body including a conduit open at its opposite ends to atmosphere and having a seamless section being open at its forward end to receive fresh air from the atmosphere, having the major portion thereof within and extending longitudinally of the shell whereby air received thereby will be heated by the exhaust gases passing over the metallic sheet, and the fabric section being outside the shell and adapted to receive heated air from the seamless section and constructed to deaden noise conducted thereby before such air is discharged into the atmosphere within a vehicle body.

4. A heating apparatus for an automobile body comprising a tubular shell constituting a portion of an engine exhaust conduit and designed to be located adjacent an engine exhaust manifold, said shell being provided throughout substantially its entire length with a cross sectional area that is larger than the cross sectional area of an ordinary exhaust conduit and being imperforate except for four openings, two at each end thereof, means for conducting exhaust gases to and from said shell including parts connected respectively to one opening at each end, one of said parts being attachable to an engine exhaust manifold, and means open at its opposite ends to the atmosphere for conducting air from the atmosphere into the shell aforesaid to be heated by the engine exhaust gases therein and thence from the shell to the atmosphere within a vehicle body, said means including a tubular conduit having a seamless section and a section of flexible material, the seamless section having the major portion thereof within and extending longitudinally of the shell and having end portions extending through the other openings at opposite ends of the shell, one of said end portions being open and adapted to receive fresh air from the atmosphere, and the fabric section being outside the shell and adapted to receive heated air from the other end of the seamless section, said fabric section being constructed to deaden noise conducted by the air discharged from the seamless section before such heated air enters the atmosphere within a vehicle body.

In testimony whereof, I have subscribed my name.

SIDNEY J. V. BOVEY.